United States Patent
Xiong et al.

(10) Patent No.: US 10,265,846 B2
(45) Date of Patent: Apr. 23, 2019

(54) SERVO

(71) Applicant: UBTECH Robotics Corp., Shenzhen (CN)

(72) Inventors: Youjun Xiong, Shenzhen (CN); Wenquan Shu, Shenzhen (CN); Guanyou Li, Shenzhen (CN); Hongbo Zhu, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 297 days.

(21) Appl. No.: 15/401,100

(22) Filed: Jan. 9, 2017

(65) Prior Publication Data
US 2018/0169855 A1    Jun. 21, 2018

(30) Foreign Application Priority Data

Dec. 15, 2016   (CN) .......................... 2016 1 1158817

(51) Int. Cl.
| | |
|---|---|
| *H02K 7/116* | (2006.01) |
| *B25J 9/10* | (2006.01) |
| *B25J 9/12* | (2006.01) |
| *H02K 11/215* | (2016.01) |
| *F16H 57/02* | (2012.01) |

(52) U.S. Cl.
CPC ............ *B25J 9/102* (2013.01); *B25J 9/126* (2013.01); *H02K 7/116* (2013.01); *H02K 11/215* (2016.01); *F16H 2057/02034* (2013.01); *H02K 2211/03* (2013.01)

(58) Field of Classification Search
CPC ....... H02K 11/215; H02K 7/116; H02K 11/21
See application file for complete search history.

(56) References Cited

U.S. PATENT DOCUMENTS

| | | | | |
|---|---|---|---|---|
| 2011/0254388 | A1* | 10/2011 | Yamasaki ............ | B62D 5/0406 310/43 |
| 2012/0286604 | A1* | 11/2012 | Abe ...................... | H02K 11/33 310/71 |
| 2012/0307476 | A1* | 12/2012 | Masuzawa ............ | H02K 11/33 361/816 |
| 2013/0099609 | A1* | 4/2013 | Ikeno .................... | H02K 29/08 310/52 |
| 2014/0312746 | A1* | 10/2014 | Taniguchi ............. | H02K 29/08 310/68 B |
| 2014/0339966 | A1* | 11/2014 | Tomizawa ............. | H02K 5/22 310/68 D |
| 2016/0352190 | A1* | 12/2016 | Hieda .................... | G01D 5/145 |
| 2017/0019007 | A1* | 1/2017 | Sadanaga ............. | H02K 29/08 |
| 2017/0225707 | A1* | 8/2017 | Tomizawa ............ | H02K 11/30 |
| 2017/0324300 | A1* | 11/2017 | Yamashita ............ | H02K 11/21 |

* cited by examiner

*Primary Examiner* — Jake Cook

(57) ABSTRACT

A servo includes a housing including a gear shaft supporting and positioning structure therein, an electric motor arranged within the housing, a speed reduction gear set, an output gear shaft including a front end protruding out of the housing and a rear end located within the housing, an angle detection device, and a control circuit board. The electric motor is engaged with the output gear shaft through the speed reduction gear set. The rear end of the output gear shaft is connected to the angle detection device. The control circuit board is connected to the electric motor and the angle detection device. The angle detection device includes a magnetic sensor arranged on the control circuit board and a magnet that is connected to the rear end of the output gear shaft and located right in front of the magnetic sensor.

10 Claims, 6 Drawing Sheets

US 10,265,846 B2

SERVO

CROSS REFERENCE TO RELATED APPLICATIONS

This application claims priority to Chinese Patent Application No. 201611158817.7, filed Dec. 15, 2016, which is hereby incorporated by reference herein in its entirety.

BACKGROUND

1. Technical Field

The present disclosure generally relates to the field of robotic control technology, and particularly to a servo.

2. Description of Related Art

Robots have many joints, and each joint is called a degree of freedom. Average machine bodies have a dozen degrees of freedom. In this way, it can ensure the flexibility of motions. In the machine bodies of robots, servos are used as connection parts of each joint, and can accomplish positioning and motions of each joint. They have simple control structures, high accuracy, high response speed, and are energy efficient. Servos are essential components for the control of robots. Generally, the output shaft of a conventional servo need to be in contact with the potentiometer for achieving angle detection. A protruding portion at the bottom of the output shaft is inserted into the potentiometer, so as to allow the rotation of the output shaft to cause the resistance value of the potentiometer to change, thereby achieving the detection of angle changes. However, during the mounting process, the output shaft needs to pass through the outer wall of the housing to mate with the potentiometer. It is difficult for positioning during the mounting process, which is not favorable to the realization of automated assembling. During operation, the output shaft may tend to cause the rotation to be unstable.

SUMMARY

A servo includes a housing including a gear shaft supporting and positioning structure therein, an electric motor arranged within the housing, a speed reduction gear set, an output gear shaft including a front end protruding out of the housing and a rear end located within the housing, an angle detection device, and a control circuit board. The electric motor is engaged with the output gear shaft through the speed reduction gear set. The rear end of the output gear shaft is connected to the angle detection device. The control circuit board is connected to the electric motor and the angle detection device. The angle detection device includes a magnetic sensor arranged on the control circuit board and a magnet that is connected to the rear end of the output gear shaft and located right in front of the magnetic sensor.

Compared with conventional servos, the servo of the present disclosure uses non-contact type angle detection device, which has no requirement for mounting angles. Thus, it is convenient for positioning during assembling and suitable for automated production. It can use a magnetic sensor for a 360-degree detection without dead angles. By sensing the change of magnetic field to detect the angle change, there would be no errors caused by the contact type potentiometers and the detection accuracy is high. The rotation of the output gear shaft is more smooth by providing a gear shaft positioning and supporting structure.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
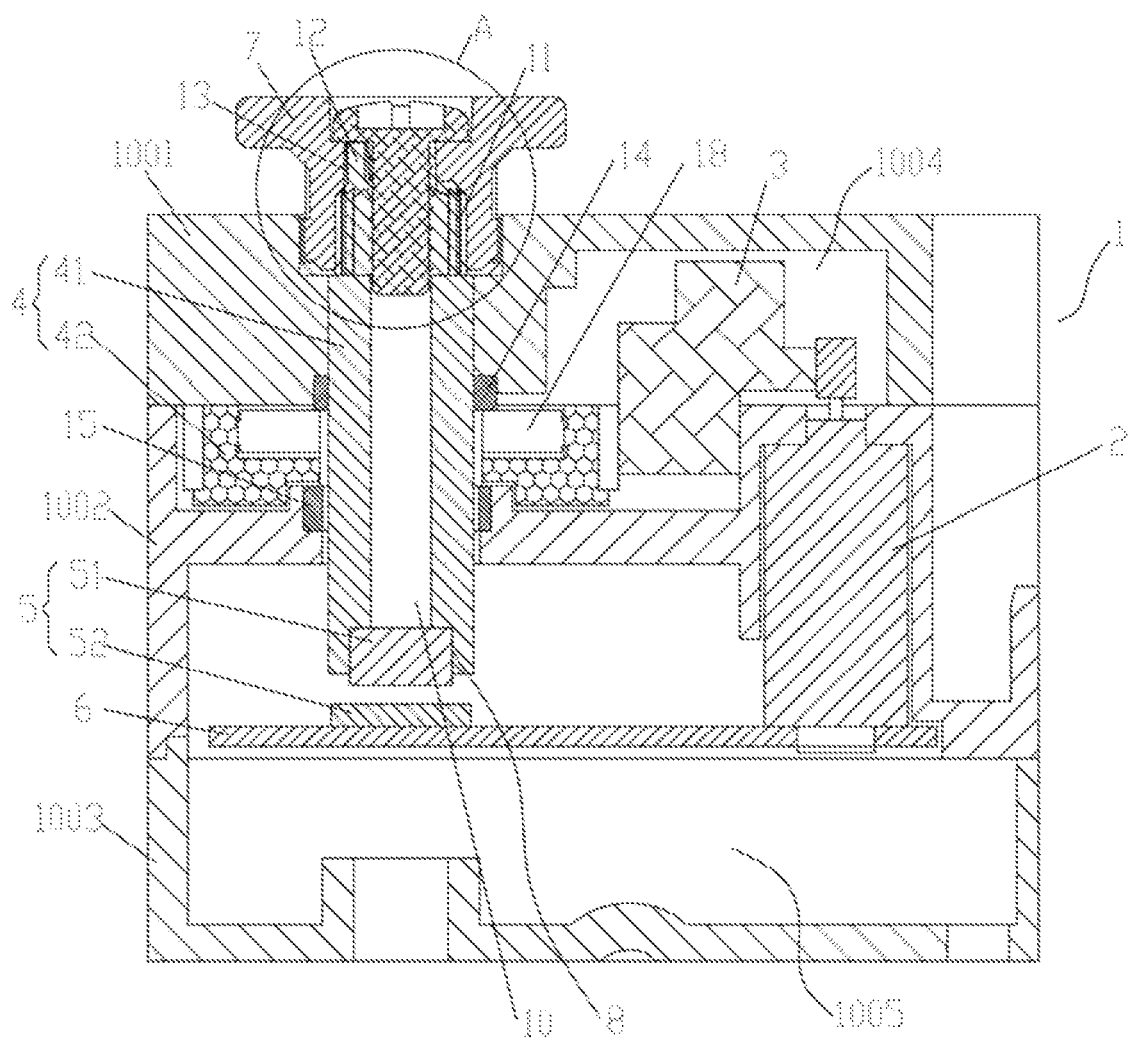
FIG. 1 is a sectional view of a servo according to one embodiment.
Figure 2:
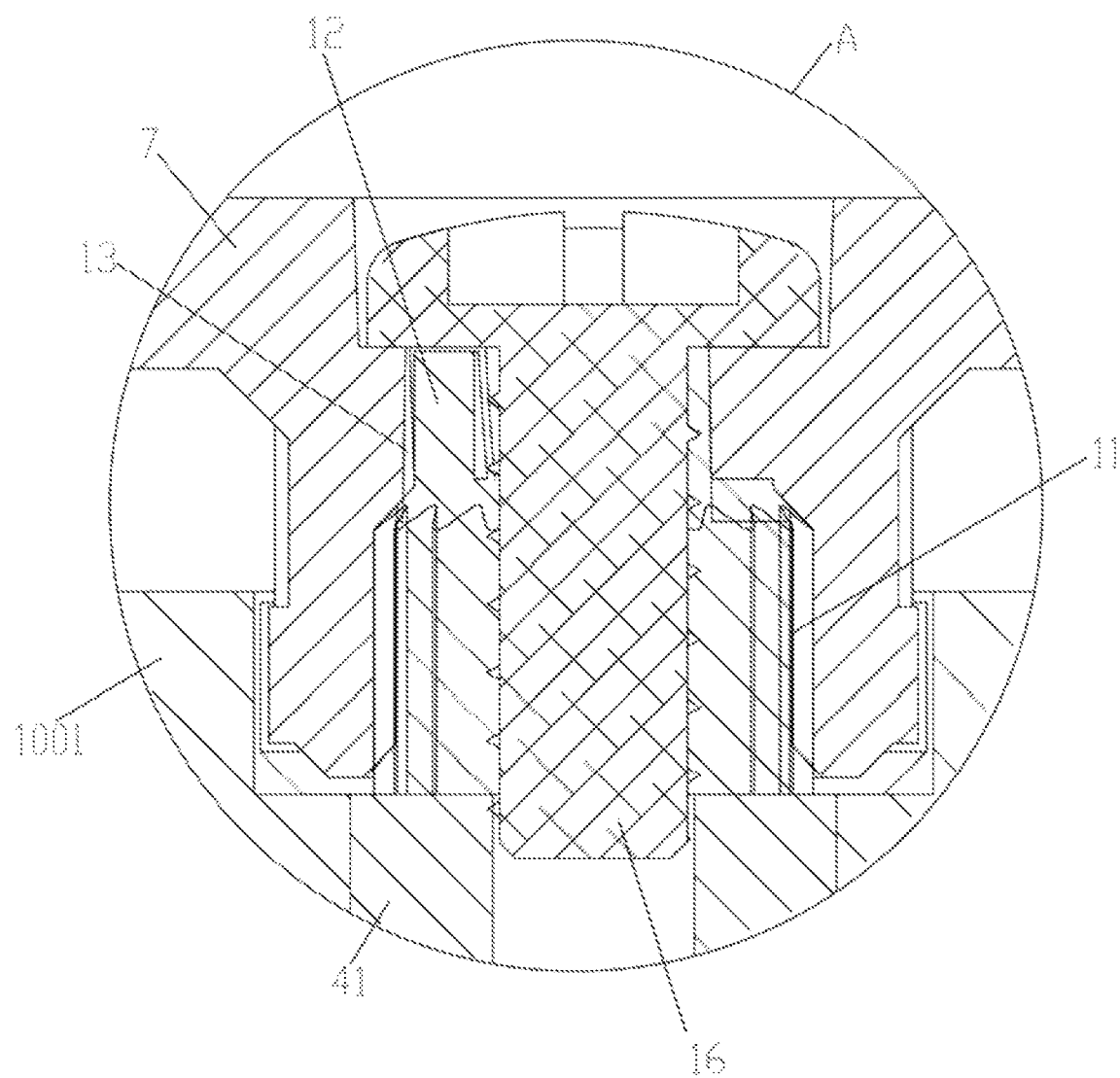
FIG. 2 is an enlarged view of the potion A of FIG. 1.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment and such references can mean "at least one" embodiment.

Referring to FIGS. 1-6, a servo includes a housing 1, an electric motor 2, a speed reduction gear set 3, an output gear shaft 4, an angle detection device 5 and a control circuit board 6. The electric motor 2 is arranged within the housing 1, and is engaged with the output gear shaft 4 through the speed reduction gear set 3. The front end of the output gear shaft 4 protrudes out of the housing 1. The rear end of the output gear shaft 4 is located within the housing 1 and connected to the angle detection device 5. The control circuit board 6 is connected to the electric motor 2 and the angle detection device 5. The angle detection device 5 includes a magnetic sensor 52 arranged on the control circuit board 6 and a magnet 51 that is connected to the rear end of the output gear shaft 4 and located right in front of the magnetic sensor 51. The interior of the housing 1 includes a gear shaft supporting and positioning structure. It should be noted that a forward direction refers to the direction starting from the end of the output gear shaft 4 that is located within the housing 1 toward the end of the output gear shaft 4 that is located outside the housing 1. An opposite direction is the backward direction.

Compared with conventional servos, the servo of the present disclosure uses non-contact type angle detection device, which has no requirement for mounting angles. Thus, it is convenient for positioning during assembling and suitable for automated production, especially for the assembling by ordinary automated production lines. The potentiometers commonly used have rotational dead angles. A 360-degree detection can be achieved by using the magnetic sensor without dead angles. Since the potentiometers of conventional servos are contact type, there may exist structural assembling gaps, which results in detection errors. By sensing the change of magnetic field to detect the angle change, there would be no errors caused by the assembling gaps of the contact type potentiometers and the detection accuracy is high. The friction exerted on the output gear shaft decreases by providing the gear shaft positioning and supporting structure, enabling the rotation of the output gear shaft to be more smooth. The gear shaft positioning and supporting structure can provide a support to the housing 1 to some extent, which increase the strength of the housing 1.

Further, the servo of the present disclosure further includes a servo disc 7 connected to the front end of the output gear shaft 4 that protrudes out of the housing 1. The servo disc 7 is mainly used to connect with an external component to transmit torque.

Further, the servo disc 7 is aligned around an outer periphery of the front end of the output gear shaft 4. The outer periphery of the front end of the output gear shaft 4 and an interior of the servo disc 7 include gear connecting structures 11 that are engaged with each other. Torque can be transmitted between the servo disc 7 and the output gear shaft 4 through the gear connecting structures 11, which enables the output of the servo disc 7 to be more stable.

Further, the front end surface of the gear shaft 4 includes a positioning protrusion 12. The servo disc 7 defines a positioning slot 13 that is used to mate with positioning protrusion 12. Positioning along the axial direction of the output gear shaft 4 of the servo disc 7 and the output gear shaft 4 can be achieved through the mating of the positioning protrusion 12 and the positioning slot 13, which improves the stability of the torque outputted by the servo.

Further, referring to FIG. 1, the rear end of the output gear shaft 4 defines a receiving chamber 8. The magnet 51 is received in the receiving chamber 8. The connection of the magnet 51 and the output gear shaft 4 can be plug-in connection, which is simple in assembling structure, has a good assembling stability and facilitates manufacturing.

Figure 5:
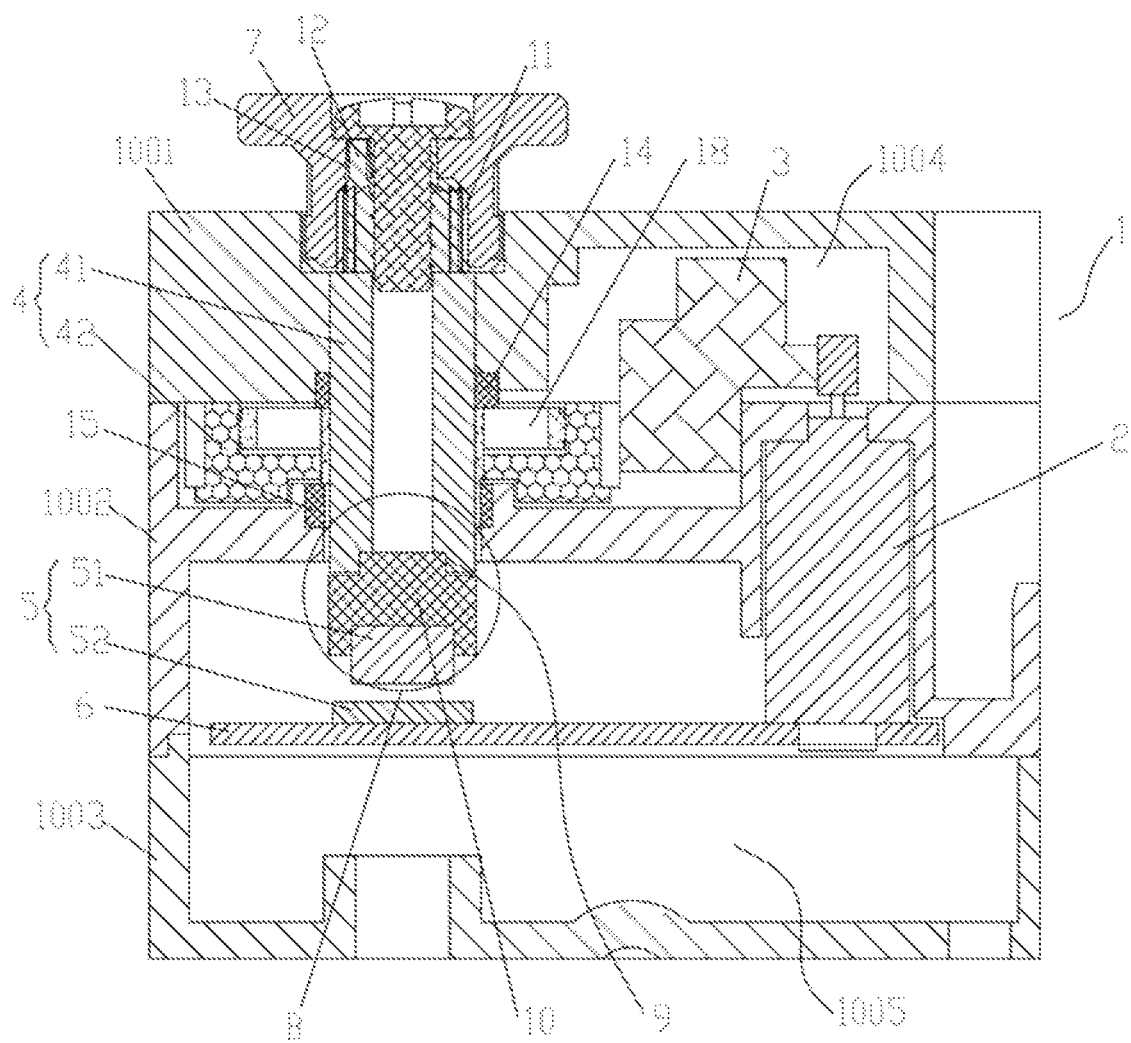
FIG. 5 is a sectional view of a servo according to another embodiment.

Further, referring to FIG. 5, the rear end of the output gear shaft 4 defines an adapter hole 9. The magnet 51 is connected to the adapter hole 9 via an adapter 10. Since the output gear shaft 4 is made of metal, it may be difficult for the magnet 51 to be connected to the output gear shaft 4 by plug-in connection. The adapter 10 with excellent elasticity can be arranged between the magnet 51 and the output gear shaft 4 for achieving plug-in connection of the magnet 51. The magnet 51 is thus fixed to the output gear shaft 4.

Specifically, the adapter 10 is made of plastic material, which is low in cost and simple for forming, and has excellent elasticity and facilitate the plug-in connection for use with hard material, such as metal.

Figure 6:
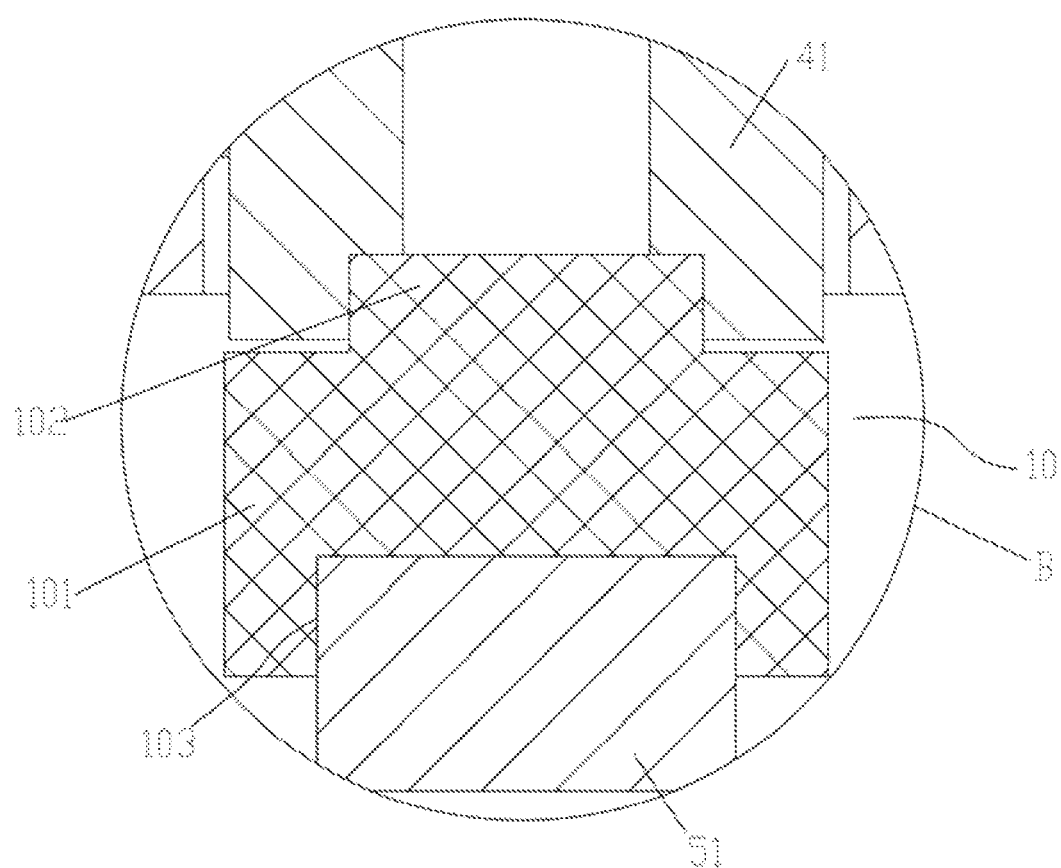
FIG. 6 is an enlarged view of the potion B of FIG. 5.

Further, referring to FIGS. 5 and 6, for ease of the plug-in connection of the output gear shaft 4 and the magnet 51 and maintaining the magnet 51 to be always right in front of the magnetic sensor 52, the adapter 10 includes an adapter body 101 and a protruding portion 102 mating with the adapter hole 9. The rear side of the adapter body 101 defines a mounting hole 103 to receive the magnet 51. The protruding portion 102 and the output gear shaft 4 form an interference fit therebetween. When the protruding portion 102 is inserted into the output gear shaft 4, it deforms easily so as to form an interference fit. The same principle applies to the plug-in connection between the adapter 101 and the magnet 51.

Further, referring to FIGS. 1-5, the servo disc 7 defines a stepped hole in its center. The front end of the output gear shaft 4 defines an inner threaded hole. The diameter of a rear section of the stepped hole is less than that of a front section of the stepped hole. The rear section of the stepped hole is arranged around the outer periphery of the front end of the output gear shaft 4. A shoulder of the front section of the stepped hole is substantially flush with the front end surface of the output gear shaft 4. The head of a fastening screw rests on the shoulder of the front section of the stepped hole, which axially positions the servo disc 7.

Further, the front end surface of the housing 1 defines a servo positioning groove. The servo positioning groove is arranged around the outer periphery of the rear end of the servo disc 7, which plays the role of positioning, thereby enabling the servo disc 7 to operate stably.

Figure 3:
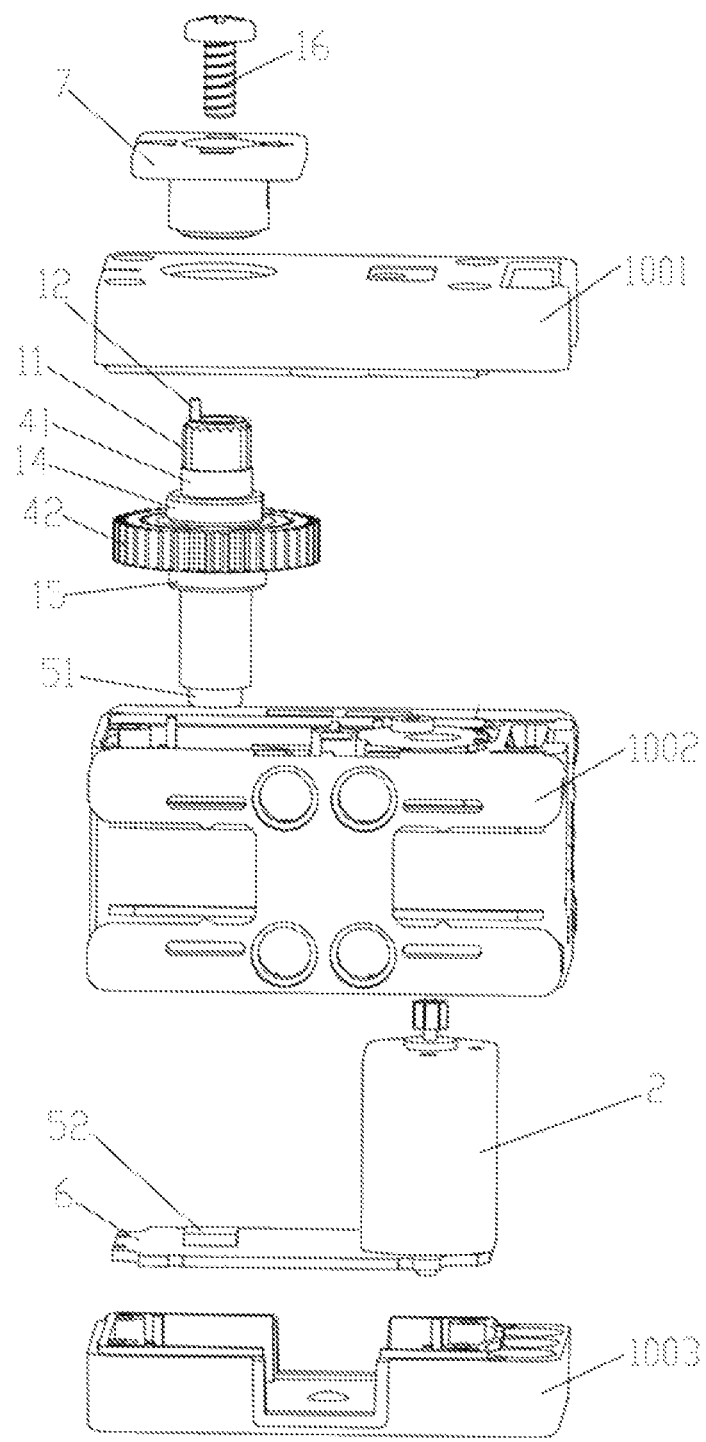
FIG. 3 is an exploded view of a servo according to one embodiment.

Further, inferring to FIGS. 1, 3 and 5, for ease of assembling, the housing 1 is constructed by several independent components. The housing 1 includes a front housing 1001, a middle housing 1002 and a rear housing 1003. The front housing 1001 and the middle housing 1002 define corporately a front chamber 1004. The middle housing 1002 and the rear housing 1003 define corporately a rear chamber 1005. The electric motor 2 is arranged within the rear chamber 1005. The output shaft of the electric motor 2 extends into the front chamber 1004. The speed reduction gear set 3 is arranged in the front chamber 1004. The output gear shaft 4 extends from the front side of the housing 1 into the rear chamber 1005, with the gear portion located in the front chamber 1004 and the angle detection device 5 in the rear chamber 1005. Such arrangement makes full use of the inner space of the housing 1, winch reduces the size of the servo.

Further, referring to FIGS. 1, 3 and 5, the gear shaft supporting and positioning structure includes a front washer 14 arranged around a front side of the gear portion of the output gear shaft 4, and a rear washer 15 arranged around a rear side of the gear portion of the output gear shaft 4. A rear side of the front housing 1001 defines a front annular groove that is used to receive the front washer 14 and form an interference fit with the front washer 14. A front side of the middle housing 1002 defines a rear annular groove that is used to receive the rear washer 15 and form an interference fit with the rear washer 15. The front washer 14 and the rear washer 15 both form a clearance fit with the output gear shaft 4.

Specifically, referring to FIGS. 1, 3 and 5, the front washer 14 and the rear washer 15 are made of wear resistant resin material. When the output gear shaft 4 rotates, the contact friction between the output gear shaft 4 and the housing 1 is high, which hinders rotation and tends to result in the wear of components. Since the housing 1 is hard and a clearance exists between the output gear shaft 4 and the housing 1, the rotation of the output gear shaft 4 may not be stable, which affects the stability of the operation of the servo. Most importantly, since the size of the servo is small, it is difficult to arrange a bearing therein. By arranging the washer of resin material that is fixed to the housing 1, it can play the role of stabilizing the output gear shaft 4 and lowering the friction exerted on the output gear shaft 4, which makes the rotation of the output gear shaft 4 more stable and increases the output efficiency of torque.

Further, referring to FIGS. 1-5, for further improving the fixing effect of the washer and the housing 1, one side of each of the front washer 14 and the rear washer 15 is provided with a position limiting surface. The inner sidewall of each of the front annular groove and the rear annular groove is provided with a position limiting platform mating with one of the position limiting surfaces, which prevents the front washer 14 and the rear washer 15 from rotating with respect to the front annular groove and the rear annular groove.

Further, for further improving the fixing effect of the washer and the housing 1, one side of each of the front washer 14 and the rear washer 15 is provided with a position limiting protrusion, and the inner sidewall of each of the front annular groove and the rear annular groove is provided with a position limiting groove mating with one of the position limiting protrusions, which prevents the front washer 14 and the rear washer 15 from rotating with respect to the front annular groove and the rear annular groove.

Figure 4:
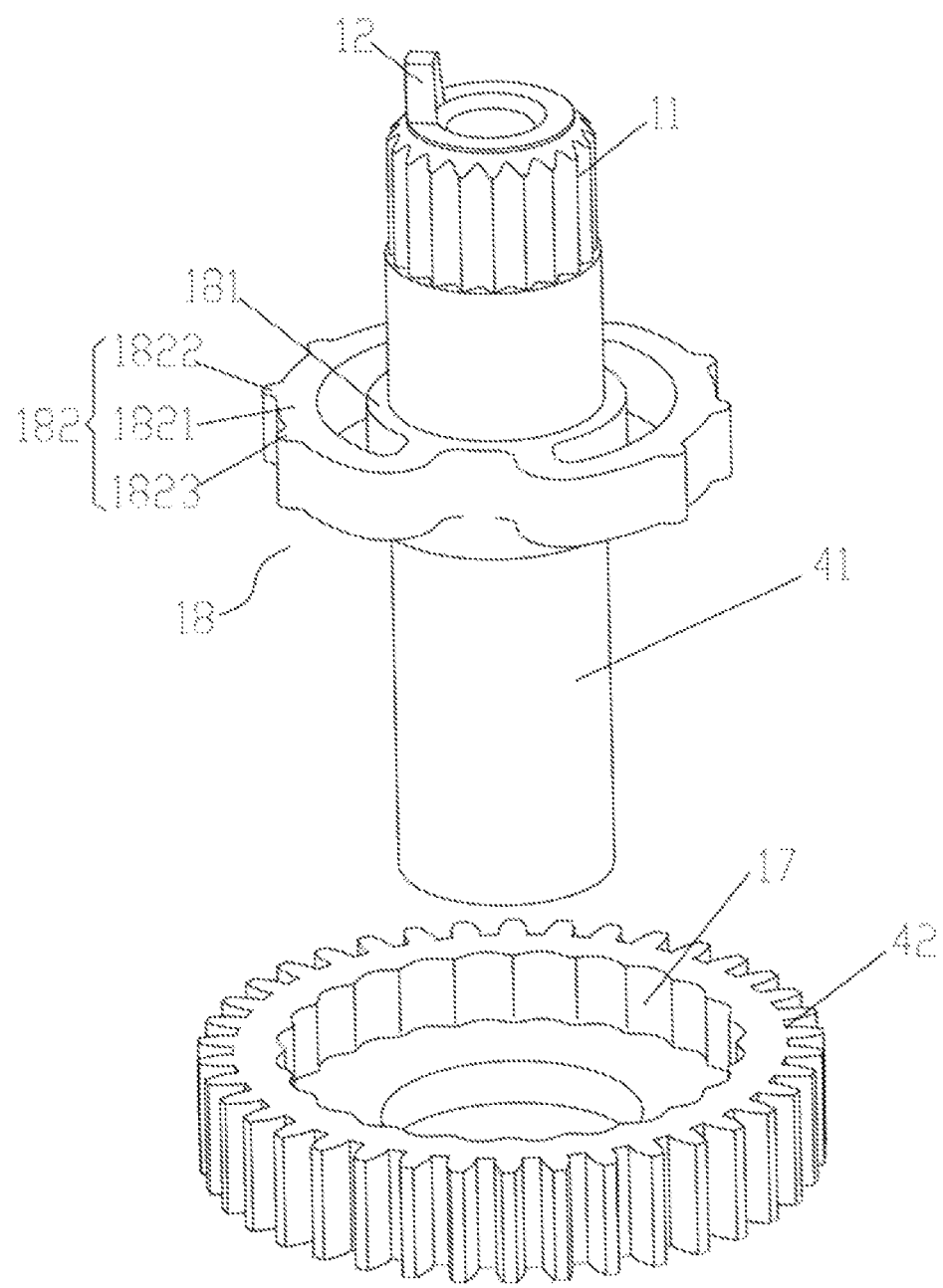
FIG. 4 is an exploded view of an output gear shaft and a gear clutch according to one embodiment.

Further, referring to FIG. 4, the output gear shaft 4 is constructed by independent components, including an output shaft 41 and an output gear 42 arranged around the output shaft 41. The output shaft 41 includes a gear clutch 18 arranged thereon. When locked rotor occurs, the gear shaft may be damaged. The gear clutch 18 is arranged to protect the gear shaft.

Further, referring to FIG. 4, the output gear 42 defines a plurality of inner concaves 17. The plurality of concaves 17 are evenly arranged around a central axis of the output shaft 41. The gear clutch 18 includes a connection sleeve 181 fixed to the output shaft 41, at least two elastic clutching structures 182 evenly arranged around a central axis of the connection sleeve and are engaged with the inner concaves 17. The output gear 42 is arranged around the connection sleeve 181 and form an interference fit with the connection sleeve 181.

Further, referring to FIG. 4, the elastic clutching structure 182 includes an elastic ring 1821, a plurality of engaging protrusions 1822 arranged on the outer side surface of the elastic ring 1821 and a cushioning protrusion 183 arranged at one side of an engaging protrusion 1822. In the normal operation state, the relative positions between the output shaft 41, the gear clutch 18 and the output gear 42 stay stable. When the locked rotor occurs and an enough external force is applied to the output shaft 41 or the output gear 42, the output gear 42 still has a tendency of rotating with respect to the connection sleeve 181. Since the elastic ring 1821 is elastic, the engaging protrusions 1822 and the cushioning protrusion has a tendency of rotating with respect to the inner concaves 17. The elastic ring 1821 is then compressed and deforms, causing the engaging protrusions 1822 and the cushioning protrusion 183 to rotate with respect to the inner concaves 17. The output gear 42 then rotates with respect to the connection sleeve 181, which effectively protects the gear or the electric motor form being damaged when the locked rotor occurs.

In one embodiment, the height of the engaging protrusions 1822 measured along the radial direction of the connection sleeve 181 is greater than the height of the cushioning protrusion 1823 measured along the radial direction of the connection sleeve 181. The cushioning protrusion 1823 plays the role of position limiting and fixing during normal operation. When the locked rotor occurs, the engagement between cushioning protrusion 1823 and one inner concave 17 is small, and the hindering of rotation mainly focuses on the engaging protrusions 1822, which allows the output gear 42 to rotate before the electric motor and the gear are damaged.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servo comprising:
    a housing comprising a gear shaft supporting and positioning structure therein;
    an electric motor arranged within the housing;
    a speed reduction gear set;
    an output gear shaft comprising a front end protruding out of the housing and a rear end located within the housing;
    an angle detection device; and
    a control circuit board;
    wherein the electric motor is engaged with the output gear shaft through the speed reduction gear set, the rear end of the output gear shaft is connected to the angle detection device, the control circuit board is connected to the electric motor and the angle detection device, and the angle detection device comprises a magnetic sensor arranged on the control circuit board and a magnet that is connected to the rear end of the output gear shaft and located right in front of the magnetic sensor.

2. The servo of claim 1, further comprising a servo disc connected to the front end of the output gear shaft.

3. The servo of claim 2, wherein the servo disc is arranged around an outer periphery of the front end of the output gear shaft, and the outer periphery of the front end of the output gear shaft and an interior of the servo disc comprise gear connecting structures that are engaged with each other.

4. The servo of claim 1, wherein the rear end of the output gear shaft defines a receiving chamber, and the magnet is received in the receiving chamber.

5. The servo of claim 1, wherein the rear end of the output gear shaft defines an adapter hole, and the magnet is connected to the adapter hole via an adapter.

6. The servo of claim 5, wherein the adapter comprises an adapter body and a protruding portion mating with the adapter hole, and a rear side of the adapter body defines a mounting hole to receive the magnet.

7. The servo of claim 1, wherein the housing comprises a front housing, a middle housing and a rear housing, the front housing and the middle housing define corporately a front chamber, and the middle housing and the rear housing define corporately a rear chamber.

8. The servo of claim 7, wherein the gear shaft supporting and positioning structure comprises a front washer arranged around a front side of a gear portion of the output gear shaft, and a rear washer arranged around a rear side of the gear portion of the output gear shaft, a rear side of the front housing defines a front annular groove that is configured to receive the front washer and form an interference fit with the front washer, a front side of the middle housing defines a rear annular groove that is configured to receive the rear washer and form an interference fit with the rear washer, and the front washer and the rear washer both form a clearance fit with the output gear shaft.

9. The servo of claim 7, wherein the output gear shaft comprises an output shaft and an output gear arranged around the output shaft, and the output shaft comprises a gear clutch arranged thereon.

10. The servo of claim 9, wherein the output gear defines a plurality of inner concaves, the plurality of concaves are evenly arranged around a central axis of the output shaft, the gear clutch comprises a connection sleeve fixed to the output shaft, at least two elastic clutching structures evenly arranged around a central axis of the connection sleeve and are engaged with the inner concaves, and the output gear is arranged around the connection sleeve and form an interference fit with the connection sleeve.

* * * * *